United States Patent
Benedict et al.

(10) Patent No.: US 10,516,145 B2
(45) Date of Patent: Dec. 24, 2019

(54) BATTERY PACK ARRAY RETENTION (71) Applicant: FORD GLOBAL TECHNOLOGIES, LLC, Dearborn, MI (US)

(72) Inventors: Scott Benedict, Plymouth, MI (US); Brent Zapczynski, Garden City, MI (US); Michael Reibling, Sterling Heights, MI (US); Eid Farha, Ann Arbor, MI (US); Patrick Daniel Maguire, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/006,233

(22) Filed: Jan. 26, 2016

(65) Prior Publication Data

US 2017/0214013 A1 Jul. 27, 2017

(51) Int. Cl.
*H01M 2/10* (2006.01)
*H01M 10/04* (2006.01)

(52) U.S. Cl.
CPC ......... *H01M 2/1077* (2013.01); *H01M 10/04* (2013.01); *H01M 2220/20* (2013.01)

(58) Field of Classification Search
CPC ............. H01M 10/04; H01M 10/0481; H01M 2220/20; H01M 2/1077
See application file for complete search history.

(56) References Cited

U.S. PATENT DOCUMENTS

| 2010/0000816 | A1* | 1/2010 | Okada | H01M 2/1077 180/68.5 |
| 2011/0008659 | A1* | 1/2011 | Okada | H01M 2/1077 429/90 |
| 2011/0151311 | A1* | 6/2011 | Lee | H01M 2/1077 429/156 |
| 2013/0136970 | A1* | 5/2013 | Kurokawa | H01M 2/1077 429/99 |
| 2013/0164592 | A1 | 6/2013 | Maguire et al. | |
| 2016/0190526 | A1* | 6/2016 | Yamada | H01M 2/1077 180/68.5 |

FOREIGN PATENT DOCUMENTS

| JP | 2005332879 | 12/2005 |
| JP | 2008306048 | 12/2008 |
| JP | 2010153128 | 12/2013 |
| WO | 2013146561 | 10/2013 |

* cited by examiner

*Primary Examiner* — Miriam Stagg
*Assistant Examiner* — Lilia Nedialkova
(74) *Attorney, Agent, or Firm* — David Kelley; Carlson, Gaskey & Olds, P.C.

(57) ABSTRACT

An exemplary battery assembly includes an endplate of a battery array, and an enclosure wall secured directly to the endplate from outside an open area of a battery pack enclosure. An exemplary method of securing a battery array includes positioning a battery array within an open area of an enclosure and, from a position outside the open area, securing an endplate of a battery array directly to a wall of a battery pack enclosure.

18 Claims, 6 Drawing Sheets

BATTERY PACK ARRAY RETENTION

TECHNICAL FIELD

This disclosure relates generally to securing a battery array and, more particularly, to securing the battery array within a battery pack enclosure.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction batteries of electrified vehicles can include a battery pack having several individual battery arrays within a battery pack enclosure. The battery arrays each typically include multiple individual battery cells that are sandwiched between endplates. Many techniques for securing the battery arrays within the battery pack enclosure require significant packaging space.

SUMMARY

A battery assembly according to an exemplary aspect of the present disclosure includes, among other things, an endplate of a battery array, and an enclosure wall secured directly to the endplate from outside an open area of the battery pack enclosure.

In a further non-limiting embodiment of the foregoing assembly, the assembly includes a mechanical fastener that secures the enclosure wall to the endplate.

In a further non-limiting embodiment of any of the foregoing assemblies, the mechanical fastener engages a bore of the endplate to directly secure the enclosure wall to the endplate.

In a further non-limiting embodiment of any of the foregoing assemblies, the assembly includes a bracket between the endplate and a surface of the enclosure wall that faces the open area. The mechanical fastener extends through a first aperture in the enclosure wall and a second aperture in the bracket to engage a bore within the endplate.

In a further non-limiting embodiment of any of the foregoing assemblies, the endplate is a first endplate of a first array, and the assembly further includes a second endplate of a second array. The bracket extends from the first endplate to the second endplate.

In a further non-limiting embodiment of any of the foregoing assemblies, the mechanical fastener extends to the endplate through a rib of the enclosure wall. The rib is raised relative to other areas of the enclosure wall.

In a further non-limiting embodiment of any of the foregoing assemblies, the enclosure wall spans from a first wall of the battery pack enclosure to an opposing, second wall of the enclosure when the enclosure wall is secured to the endplate.

In a further non-limiting embodiment of any of the foregoing assemblies, the enclosure wall is a tray that directly supports the battery array.

In a further non-limiting embodiment of any of the foregoing assemblies, the endplate is a first endplate at a first end of the battery array, and the battery array includes a second endplate at an opposing, second end of the battery array. The enclosure wall is secured directly to both the first endplate and the second endplate.

In a further non-limiting embodiment of any of the foregoing assemblies, the enclosure wall is a lid, and the endplate extends from the lid to a tray. The endplate is secured to lid from outside the open area of the battery pack enclosure. The endplate is further secured to the tray from outside the open area of the battery pack enclosure.

In a further non-limiting embodiment of any of the foregoing assemblies, the endplate is spaced from an endwall of the battery pack enclosure.

In a further non-limiting embodiment of any of the foregoing assemblies, the battery enclosure holds the battery array and a plurality of other battery arrays.

In a further non-limiting embodiment of any of the foregoing assemblies, the enclosure wall faces a first side of the battery array, and a second side of the battery array includes battery cell terminals. The first side is opposite the second side.

A method of securing a battery array according to an exemplary aspect of the present disclosure includes, among other things, positioning a battery array within an open area of an enclosure. From a position outside the open area, the method includes securing an endplate of a battery array directly to an enclosure wall of a battery pack enclosure.

In a further non-limiting embodiment of the foregoing method, the battery array is positioned between a first sidewall and an opposing, second sidewall of the enclosure after the securing.

In a further non-limiting embodiment of any of the foregoing methods, the wall is a first wall, and the method further comprises securing the endplate to another wall of the battery pack enclosure prior to securing the endplate to the first wall from the position outside the open area.

In a further non-limiting embodiment of any of the foregoing methods, the securing comprises securing a mechanical fastener to a threaded bore within the endplate.

In a further non-limiting embodiment of any of the foregoing methods, the mechanical fastener extends to the endplate through an aperture in the enclosure wall and an aperture in a bracket. The bracket is positioned between a surface of the enclosure wall facing the open area and a surface of the endplate.

In a further non-limiting embodiment of any of the foregoing methods, the mechanical fastener extends to the endplate through a rib of the enclosure wall. The rib is raised relative to other areas of the enclosure wall.

In a further non-limiting embodiment of any of the foregoing methods, the enclosure wall encloses the open area.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to securing battery arrays within an enclosure of a battery pack. The securing techniques disclosed herein utilize relatively little packaging space. The securing can occur from a position outside an open area of the enclosure. That is, the securing can occur from a position that is external to the battery pack.

Figure 1:
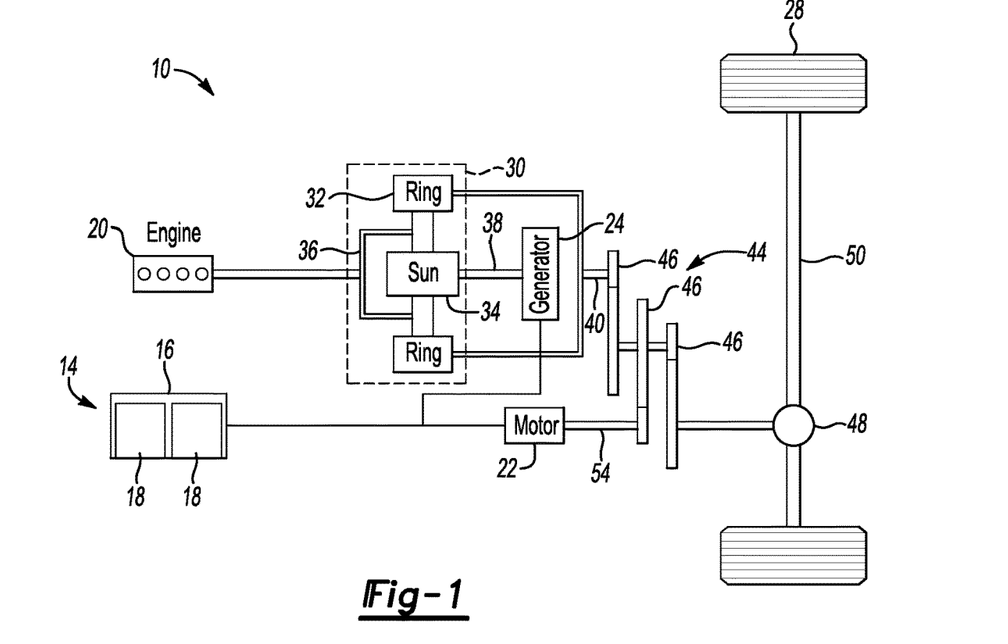
FIG. 1 shows an example electrified vehicle powertrain.

Referring to FIG. 1, a powertrain 10 of a hybrid electric vehicle (HEV) includes a battery pack 14 including an enclosure 16 housing a plurality of battery arrays 18. The powertrain 10 further includes an internal combustion engine 20, a motor 22, and a generator 24. The motor 22 and the generator 24 are types of electric machines. The motor 22 and generator 24 can be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44.

In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
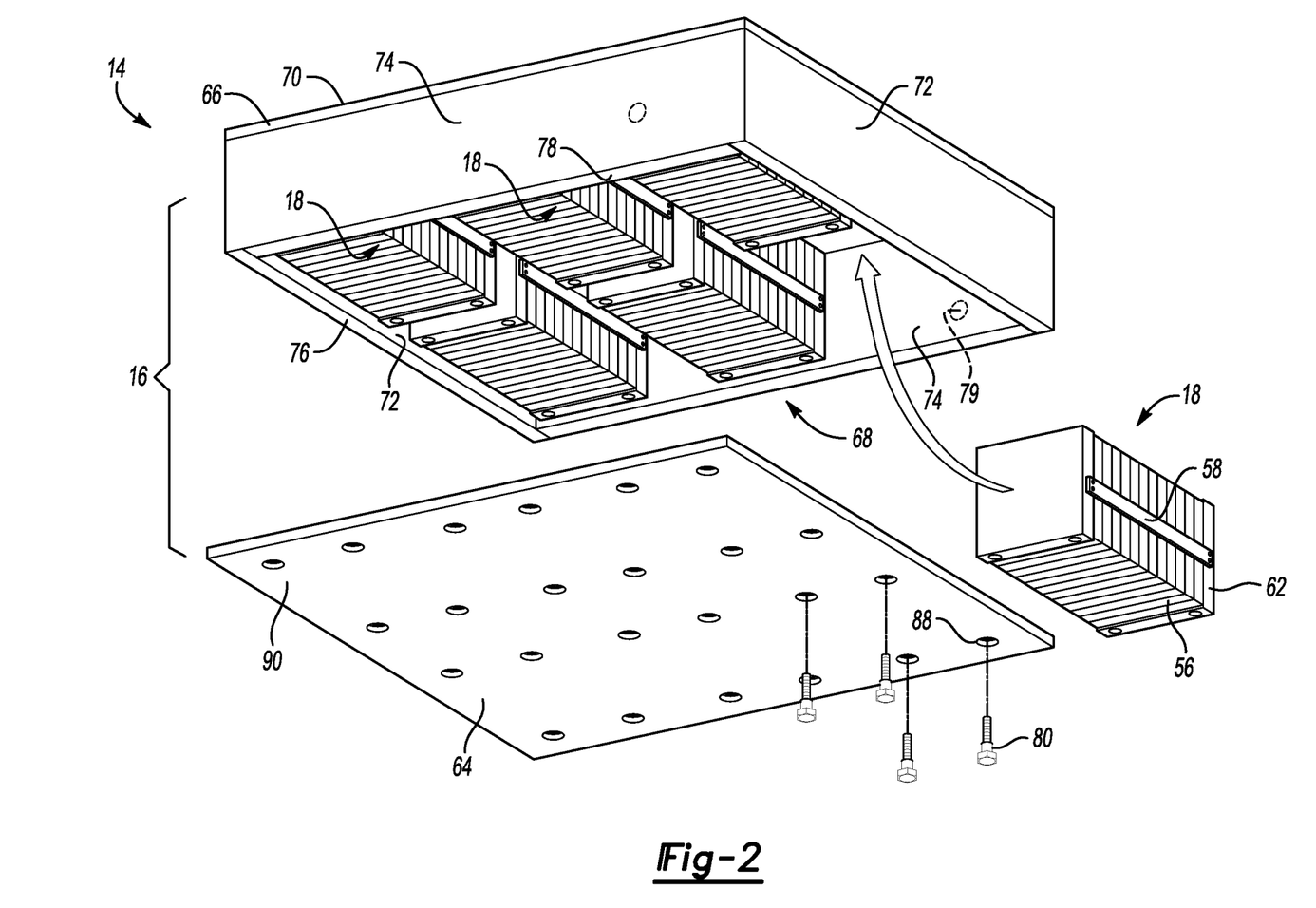
FIG. 2 shows a perspective, partially exploded view of an example battery pack from the powertrain of FIG. 1.

Referring now to FIG. 2 with continuing reference to FIG. 1, the example battery pack 14 includes six of the battery arrays 18 within the enclosure 16. The example battery arrays 18 are arranged in a 2×3 grid pattern. Other example battery packs could include other numbers of battery arrays 18 and other grid patterns.

Each of the example battery arrays 18 includes battery cells 56, binding arms 58, and a pair of endplates 62. Opposing ends of the binding arms 58 are attached to the endplates 62 to hold the position of the endplates 62 relative to each other. The battery cells 56 are clamped and sandwiched between the endplates 62.

Each of the example battery arrays 18 includes from ten to fifteen individual battery cells 56. Other example battery arrays could include less than ten battery cells or more than fifteen battery cells.

Other example battery arrays could use structures other than the binding arms 58 to hold the positions of the endplates 62. Straps, for example, could loop around the endplates 62 to hold the endplates 62 against the battery cells 56.

The enclosure 16 includes a tray 64 and a lid 66. The enclosure 16 provides an open area 68 or chamber that receives the battery arrays 18. The open area 68 can house other components in addition to the battery arrays 18, such as, for example, battery control modules, busbars, electrical connectors, etc.

The lid 66, in this example, includes an enclosure wall that spans between opposing sidewalls 72 and spans between opposing endwalls 74. In this example, the enclosure wall is considered a top 70.

The tray 64 is another enclosure wall that spans between opposing sidewalls 72 and opposing endwalls when the tray 64 encloses the open area 68.

The example sidewalls 72 and the endwalls 74 extend downwardly from the top 70. In another example, the sidewalls 72 and the endwalls 74 could extend upwardly from the tray 64.

The sidewalls 72 and endwalls 74 can be molded or cast with the top 70 such that the lid 66 is a single unitary structure. The sidewalls 72 and endwalls 74 could instead be separate from the top 70, and secured to the top 70 using, for example, adhesive, fasteners, welds, or some combination of these.

If the sidewalls 72 or endwalls 74 are separate from the top 70, the sidewalls 72 or endwalls 74 can be extruded. The sidewalls 72 and endwalls 74 can be an extruded metallic material, for example.

The tray 64 is configured to abut surfaces 76 of the sidewalls 72 and surfaces 78 of endwalls 74 to enclose the open area 68. The example surfaces 76 and 78 face downwardly in this example.

The enclosure 16 can include ports 79 for electrically connecting the battery arrays 18 to components of the powertrain 10. The ports 79 could provide access for thermal management components, such as conduits that carry a coolant fluid to and from the battery arrays 18 within the open area 68. The positioning of the ports 79 can depend on where the battery pack 14 is secured within the HEV. The ports 79 can be used for other components or provide passages for fluid, for example, between the open area 68 of the battery pack 14 and an area that is external to the battery pack 14.

The enclosure 16 can be secured within the HEV when the battery arrays 18 are positioned within the open area 68 and the lid 66 is secured to the tray 64. The battery pack 14 can be, for example, secured within a trunk compartment or beneath passenger seats of the HEV. In other examples, the enclosure 16 can be secured to an underbody of the HEV.

Although the battery pack 14 is described in connection with a HEV, the battery pack 14 could be incorporated into other types of electrified vehicles.

The enclosure 16, among other things, protects the battery arrays 18 and provides a barrier to guard against inadvertent or unwanted access. Stabilizing the battery arrays 18 within the open area 68 is often required to ensure that the position of the battery arrays 18 is maintained, especially during operation and movement of the HEV. The example battery pack 14 incorporates features used to secure the battery arrays 18 within the open area 68 of the enclosure 16 from outside the open area 68.

Figure 3:
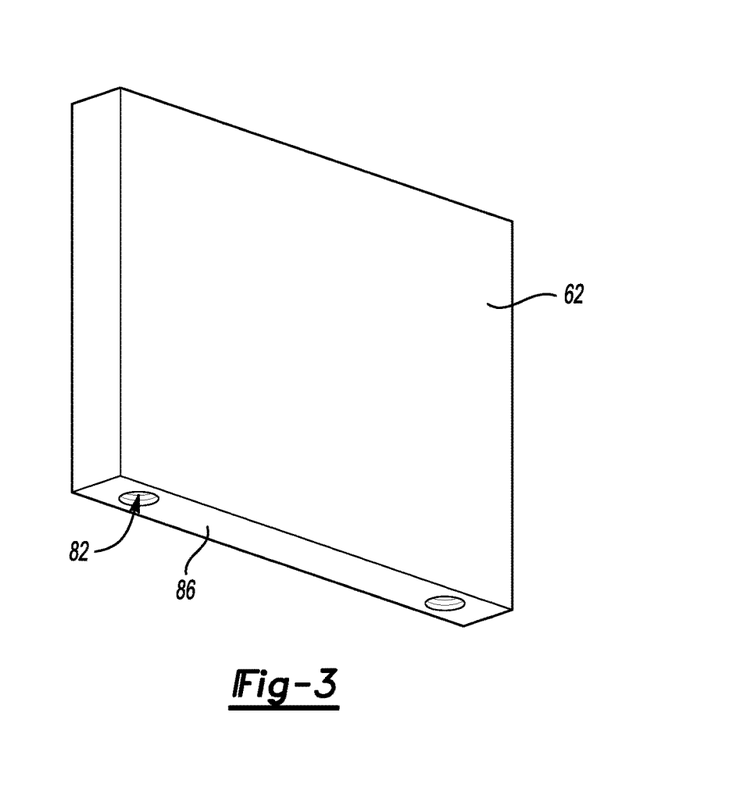
FIG. 3 shows a perspective view of an example endplate from a battery array of the battery pack of FIG. 2.
Figure 4:
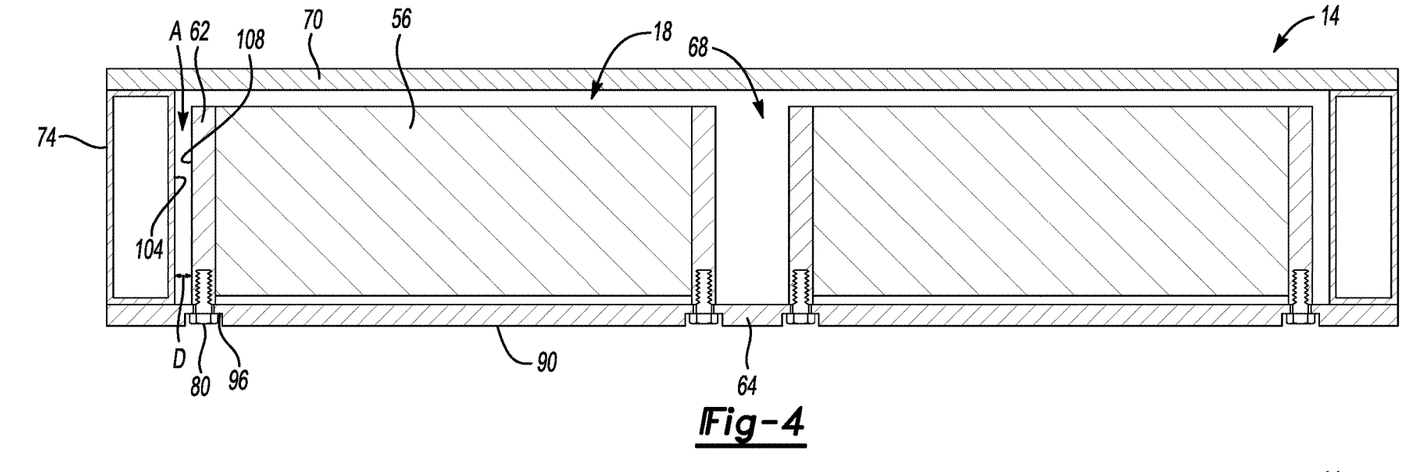
FIG. 4 shows a schematic section view of the battery pack of FIG. 2.
Figure 5:
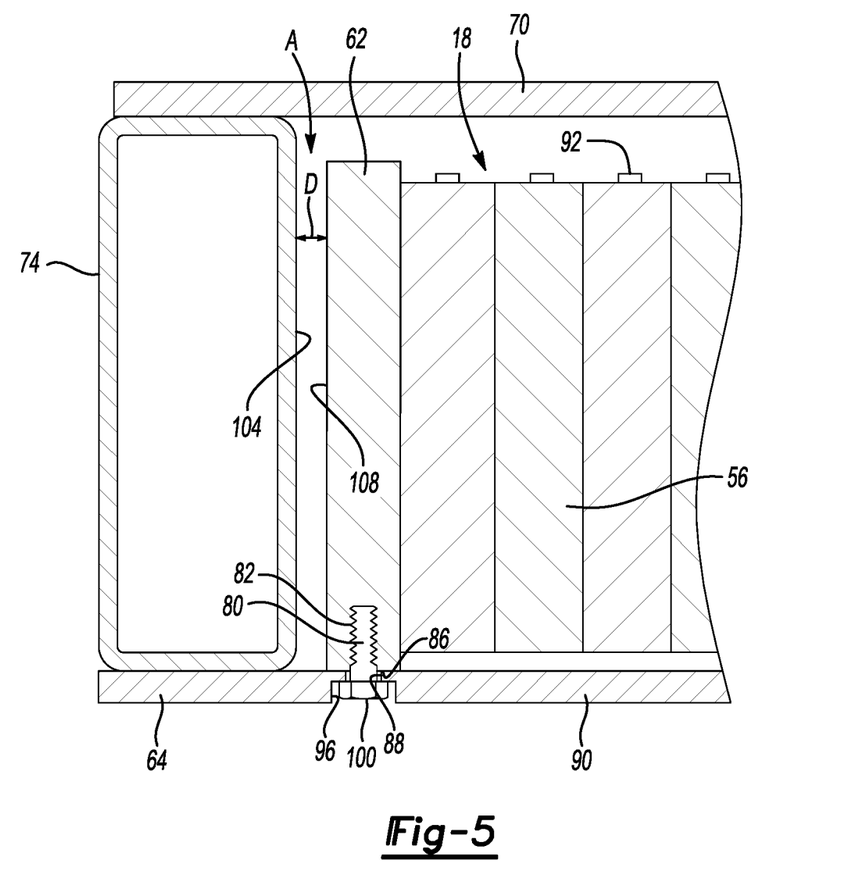
FIG. 5 shows a close-up view of an area of the battery pack of FIG. 4.

Referring now to FIGS. 3 to 5 with continuing reference to FIG. 2, the endplates 62 of the battery arrays 18 are secured directly to the tray 64 using mechanical fasteners 80. Each endplate 62 includes a pair of bores 82 that open to a downwardly facing surface 86 of the endplate 62. The bores 82 are threaded in this example so that the bores 82 can receive and threadably engage with one of the mechanical fasteners 80.

The mechanical fasteners 80 extend through respective apertures 88 within the tray 64 to engage the bores 82 of the endplates 62. Notably, the fasteners 80 are accessible from a downwardly facing surface 90 of the tray 64 facing outwardly from the open area 68. A user can thus engage the mechanical fasteners 80 from a position outside the open area 68 to secure the endplates 62 relative to the tray 64. The user can engage the mechanical fasteners with, for example, a driver that turns the mechanical fastener 80 into the bore 82 to draw the tray 64 against the downwardly facing surface 86.

In this example, the battery cells 56 include a terminal side having terminals 92 that face upwardly toward the top 70. The terminal side of the battery arrays 18 is considered a vertical top of the battery arrays 18. The tray 64 secures adjacent vertical bottoms of the battery arrays 18 on side of the battery arrays 18 opposite the terminal side of the battery cells 56.

The apertures 88 include a recess 96 to receive a head 100 of the mechanical fastener 80. This permits countersinking the fastener 80 within the tray 64 such that no portion of the head 100 extends downwardly past the tray 64 when the mechanical fastener 80 engages the endplate 62 through the bore 82.

Notably, because the endplate 62 provides the bore 82 that receives the mechanical fastener 80, no separate structure extending laterally from the endplate 62 into an area A is required to secure the arrays 18 within the open area 68. The approach reduces a distance D that is required between the endplate 62 and the endwall 74 since the area A between an inwardly facing surface 104 of the endwall 74 and an outwardly facing surface 108 of the endplate 62 does not need to accommodate a fastener or other attachment features. Reducing the distance D desirably can reduce the overall size of the battery pack 14 and a required packaging footprint within a vehicle.

In some examples, the arrays 18 can be secured to the tray 64 and, after the arrays 18 are secured, the lid 66 is positioned over the arrays 18 to enclose the arrays 18 within the open area 68.

The lid 66 can be adhesively secured to the tray 64 to hold the lid 66 relative to the tray 64. In another example, the lid 66 could be secured to the tray 64 utilizing welding techniques or mechanical fasteners.

In the FIGS. 4 and 5 embodiment, the endplates 62 stop short of extending to the top 70.

Figure 6:
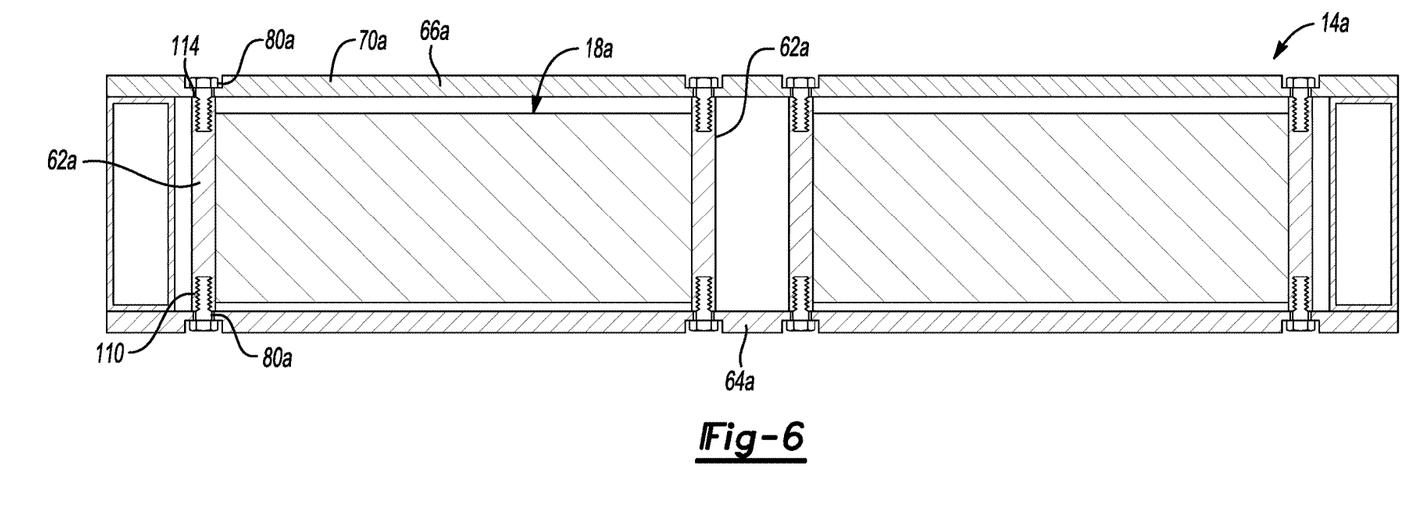
FIG. 6 shows a section view of a battery pack according to another exemplary embodiment.

Referring now to FIG. 6, a battery pack 14a according to another exemplary embodiment includes arrays 18a having endplates 62a that extend from a tray 64a to a top 70a of a lid 66a.

Mechanical fasteners 80a can secure the endplates 62a to the tray 64a and to the top 70a. The endplates 62a include bores opening to a downwardly facing surface 110 of the endplates 62a and bores opening to an upwardly facing surface 114 of the endplates 62a. The mechanical fasteners 80a are also received within the bores opening to the downwardly facing surface 110. These mechanical fasteners 80a extend through apertures in the tray 64a. The mechanical fasteners 80a that are received within bores opening to the upwardly facing surface 114 extend through apertures in the top 70a. The mechanical fasteners 80a can be countersunk within the tray 64a or the top 70a.

Figure 7:
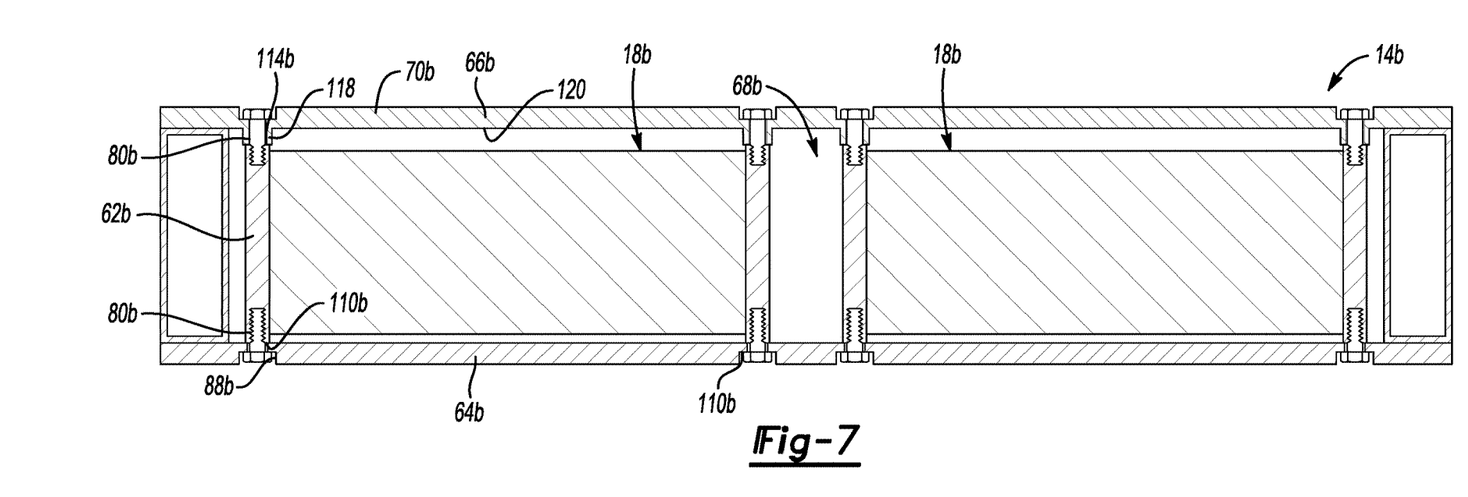
FIG. 7 shows a section view of a battery pack according to yet another exemplary embodiment.

Referring now to FIG. 7, another exemplary battery pack 14b includes a top 70b of a lid 66b having ribs 118 that extend from a primary surface 120 of the top 70b toward an open area 68b of the battery pack 14b. The ribs 118 extend to contact upwardly facing surfaces 114b of endplates 62b. Mechanical fasteners 80b extend through apertures in the top 70b and the ribs 118, and are received in bores of the endplates 62b that open to the upwardly facing surface 114b of the endplate 62b.

The ribs 118 are protrude from the primary surface 120. The ribs 118 contact with the upwardly facing surface 114 can help secure the arrays 18a within the open area 68b.

The example arrays 18a are further secured with mechanical fasteners 80b extending through apertures 88b in a tray 64b to engage with bores of the endplates 62b opening to downwardly facing surfaces 110b of the endplates 62b.

Figure 8:
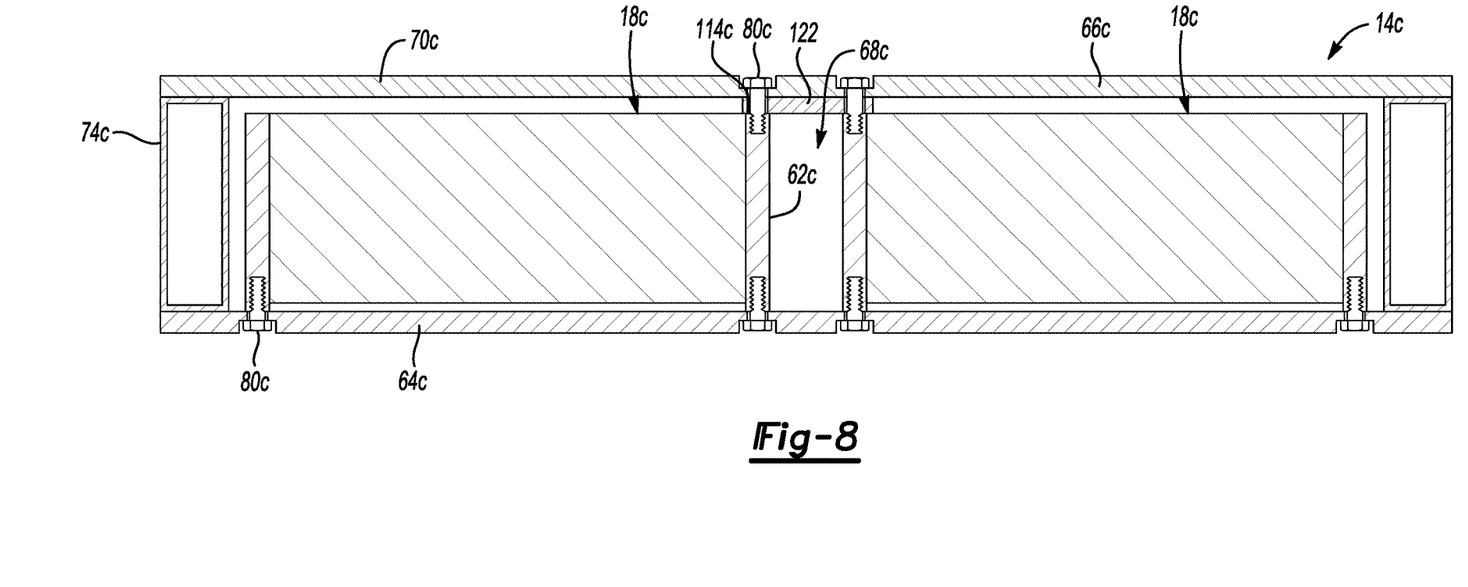
FIG. 8 shows a section view of a battery pack according to yet another exemplary embodiment.

Referring now to FIG. 8, another exemplary battery pack 14c utilizes a bracket 122 positioned between upwardly facing surfaces 114c of endplates 62c and a top 70c of a lid 66c. Mechanical fasteners 80c extend through apertures in the lid 66c and apertures of the bracket 122. The mechanical fasteners 80c are received within bores of the endplates 62c that open to the upwardly facing surfaces 114c of the endplates 62c. The endplates 62c may be additionally secured within an open area 68c of the battery pack 14c utilizing mechanical fasteners 80c extending through apertures in a tray 64c.

As shown, in this example, each of the endplates 62c is not be secured utilizing mechanical fasteners 80c that extend through the lid 66c and the bracket 122. Instead, selected endplates 62c, such as the endplates 62c near a median of the battery pack 14c as shown, are secured in this way. The remaining endplates 62c that are closer to the endwalls 74c are secured within the open area 68c utilizing the mechanical fasteners 80c that extend through apertures in the tray 64c, but not with mechanical fasteners 80c that extend through apertures in the lid 66c. In another example, each of the endplates 62c is secured with mechanical fasteners extending through apertures in a bracket and apertures in the lid 66c.

In this example, the bracket 122 spans from the endplate 62c of one array 18c to the endplate 62c of another array 18c. In another example, the bracket 122 is associated with a single endplate 62c and does not span from endplates 62c of different battery arrays 18c as is shown.

Figure 9:
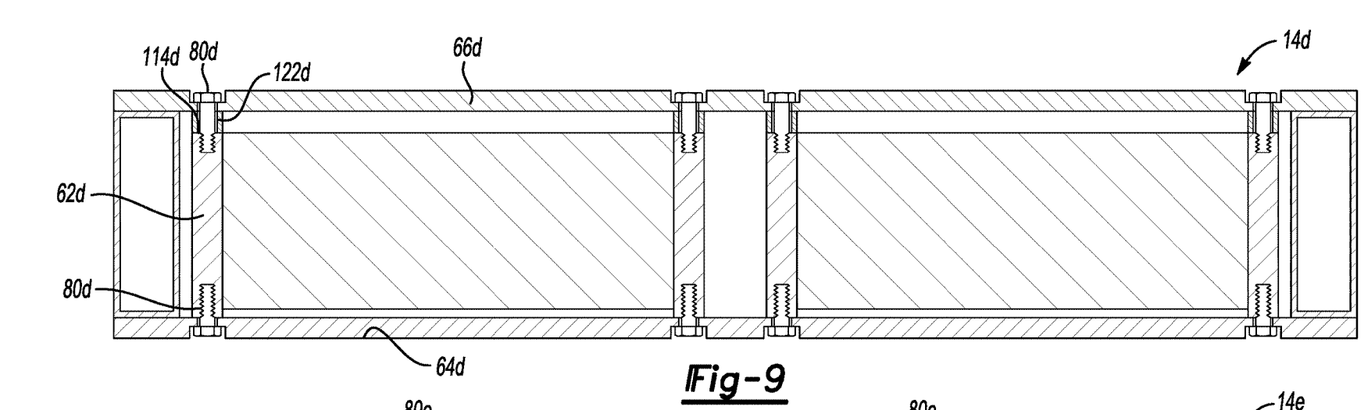
FIG. 9 shows a section view of a battery pack according to yet another exemplary embodiment.

Referring now to FIG. 9, another example battery pack 14d includes individual brackets 122d associated with each endplate 62d. The endplates 62d are secured using mechanical fasteners 80d that extend through apertures in the lid 66d and apertures in the brackets 122d. The mechanical fasteners 80d can each engage bores of the endplates 62d that opens to an upwardly facing surface 114d of the endplates 62d.

The endplates 62d are additionally secured using mechanical fasteners 80d extending through apertures in a tray 64d.

In this example, each of the endplates 62d is secured directly to the tray 64d and the lid 66d. In other examples, the endplates 62d could be secured only to the tray 64d, or only to the lid 66d.

Figure 10:
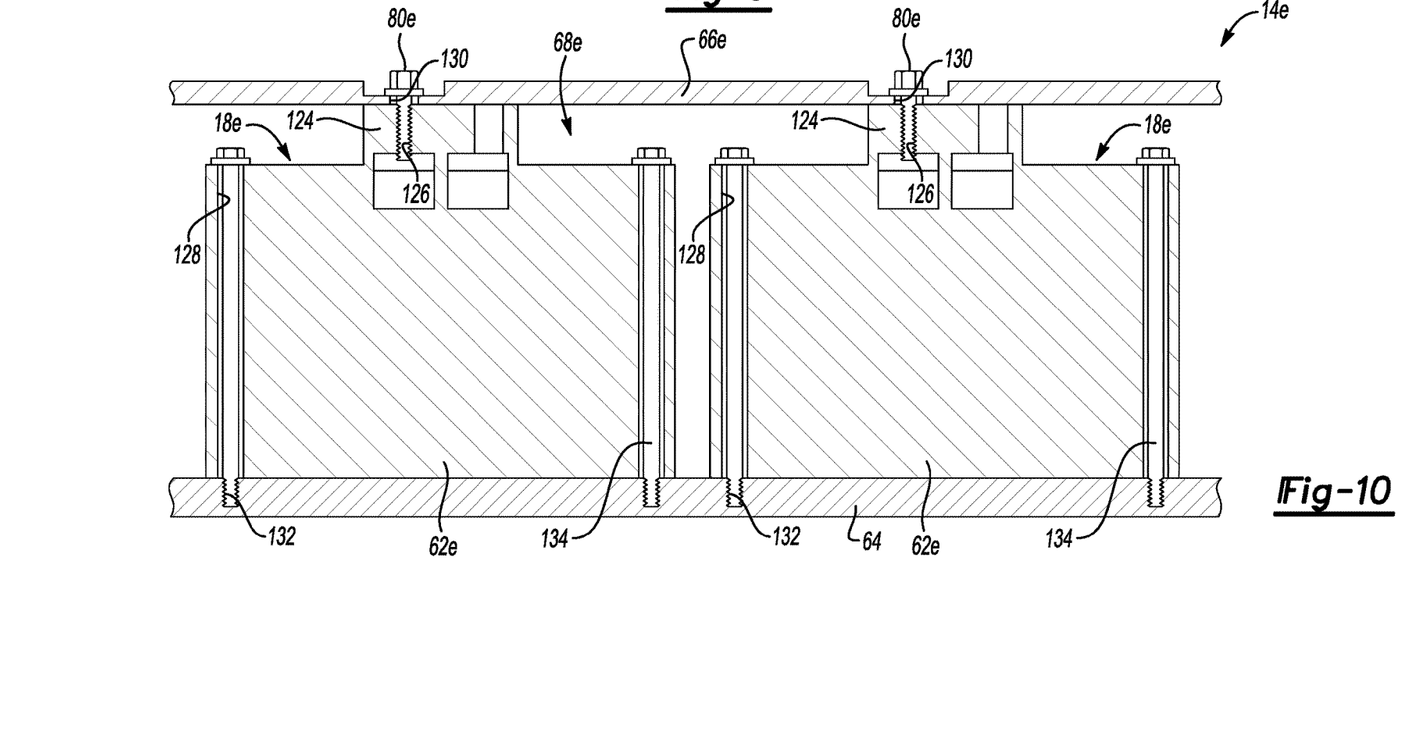
FIG. 10 shows an end section view of a battery pack according to yet another exemplary embodiment.

Referring now to FIG. 10, another example battery pack 14e includes endplates 62e with a boss portion 124 extending towards the lid 66e. The endplates 62e from two arrays are shown.

The boss portion 124 can be molded or cast with an associated one of the endplates 62e or could be a separate structure attached to the endplates 62e. The boss portion 124 provides a threaded bore 126.

The endplates 62e define through-holes 128 near the boss portion 124. In this example, the through-holes 128 are laterally outside the boss portion 124. The lid 66 defines apertures 130, and the tray 64 defines threaded holes 132.

In the embodiment of FIG. 10, the endplates 62e are first secured using mechanical fasteners 134 that extend through the through-holes 128 of the endplates and engage the threaded holes 132 of the tray 64. The endplates 62e are then secured from a position that is external to the battery pack 14 and outside an open area 68e of the battery pack 14. The securing uses another mechanical fastener 80e that extends through the aperture 130 of the lid 66 and engages the threaded bore 126 of the boss portion 124. In this example, fastening the endplate 62e to the tray 64 prior to securing the endplate 62e to the lid 66e can ease assembly. Fastening the endplate 62e to both the tray 64 and lid 66 can increase a strength of the battery pack 14e and reinforces the lid 66e across long spans.

Features of the disclosed examples includes securing an endplate within an open area of a battery pack enclosure from a position outside the open area (i.e., an area that is external to the battery pack enclosure). The securing holds a battery array within the battery pack enclosure. The securing can be accomplished from outside the open area of the battery pack enclosure. This can, among other things, reduce manufacturing complexity. Further, the described securing arrangements can reduce a packaging footprint of the battery pack by facilitating positioning the endplates of the battery arrays closer to the sidewalls of the battery pack enclosure.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
   a first endplate of a first battery array;
   a second endplate of a second battery array;
   an enclosure wall secured directly to the first and second endplates from outside an open area of a battery pack enclosure;
   a mechanical fastener that secures the enclosure wall to the first endplate; and
   a bracket between the first endplate and a surface of the enclosure wall that faces the open area, the mechanical fastener extending through a first aperture in the enclosure wall, and a second aperture in the bracket to engage a bore within the first endplate.

2. The battery assembly of claim 1, wherein the bracket extends from the first endplate to the second endplate.

3. The battery assembly of claim 1, wherein the enclosure wall spans from a first wall of the battery pack enclosure to an opposing, second wall of the enclosure when the enclosure wall is secured to the first endplate.

4. The battery assembly of claim 1, wherein the enclosure wall is a tray that directly supports the first and second battery array.

5. The battery assembly of claim 1, wherein the first endplate is at a first end of the first battery array, and the first battery array includes a third endplate at an opposing, second end of the first battery array, the enclosure wall secured directly to both the first endplate and the third endplate.

6. The battery assembly of claim 1, wherein the enclosure wall is a lid, and the first endplate extends from the lid to a tray, the first endplate secured to the lid from outside the open area of the battery pack enclosure, the first endplate further secured to the tray from outside the open area of the battery pack enclosure.

7. The battery assembly of claim 1, wherein the first endplate is spaced from an endwall of the battery pack enclosure, the endwall extending transversely from the enclosure wall.

8. The battery assembly of claim 1, wherein the enclosure wall faces a first side of the first battery array, and a second side of the first battery array includes battery cell terminals, the first side opposite the second side.

9. The battery assembly of claim 1, wherein the battery pack enclosure includes a top, a tray, and sidewalls extending therebetween, the first and second endplates of the first and second battery arrays spaced a distance from each of the sidewalls.

10. The battery assembly of claim 1, wherein the enclosure wall encloses the open area of the battery pack enclosure.

11. The battery assembly of claim 1, wherein the battery pack enclosure encloses a single tier of battery arrays, the first and second battery arrays within the single tier of battery arrays.

12. A method of securing a battery array, comprising:
   positioning a first and a second battery array within an open area of an enclosure; and
   from a position outside the open area of the enclosure, securing a first endplate of the first battery array and a second endplate of the second battery array directly to a wall of the enclosure, the securing including securing using a mechanical fastener that extends through an aperture in a bracket that is positioned between a surface of the wall facing the open area and a surface of the first endplate.

13. The method of claim 12, wherein the first and second battery arrays are positioned between a first sidewall and an opposing, second sidewall of the enclosure after the securing, the first and second sidewalls extending transversely from opposing sides of the wall, the first and second sidewalls spaced a distance from the first and second battery arrays.

14. The method of claim 12, wherein the wall is a first wall, and further comprising securing the first and second endplates to another wall of the battery pack enclosure from a position outside the open area of the enclosure prior to securing the first and second endplates to the first wall from the position outside the open area.

15. The method of claim 12, wherein the securing comprises securing the mechanical fastener to a threaded bore within the first endplate.

16. The method of claim 12, wherein the mechanical fastener extends to the first endplate through an aperture in the wall.

17. The method of claim 12, wherein the wall encloses the open area.

18. A battery assembly, comprising:
a first endplate of a first battery array;
a second endplate of a second battery array; and
a lid secured directly to the first and second endplates from outside an open area of a battery pack enclosure;
a bracket; and
a tray,
wherein the bracket is between the lid and the first endplate,
wherein a mechanical fastener extends through both a first aperture in the lid and a second aperture in the bracket when the first endplate is secured to the lid,
wherein the first endplate is further secured to the tray of the battery pack enclosure from outside the open area of the battery pack enclosure.

* * * * *